(12) United States Patent
Sihler

(10) Patent No.: US 8,714,245 B2
(45) Date of Patent: May 6, 2014

(54) COILED TUBING ORIENTER TOOL WITH HIGH TORQUE PLANETARY GEAR STAGE DESIGN DRIVE

(75) Inventor: Joachim Sihler, Cheltenham (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 539 days.

(21) Appl. No.: 12/974,035

(22) Filed: Dec. 21, 2010

(65) Prior Publication Data

US 2011/0315450 A1    Dec. 29, 2011

Related U.S. Application Data

(60) Provisional application No. 61/288,545, filed on Dec. 21, 2009.

(51) Int. Cl.
*E21B 47/00* (2012.01)

(52) U.S. Cl.
USPC ......................................... 166/255.2; 175/61

(58) Field of Classification Search
USPC ............ 166/255.2, 255.3; 175/61, 62, 74, 75; 475/254–268, 346, 347
See application file for complete search history.

(56) References Cited

U.S. PATENT DOCUMENTS

| | | | | |
|---|---|---|---|---|
| 3,616,708 A | * | 11/1971 | Davis | 4/410 |
| 3,669,199 A | * | 6/1972 | Cullen et al. | 175/106 |
| 4,825,723 A | * | 5/1989 | Martin | 475/332 |
| 5,956,998 A | * | 9/1999 | Fenelon | 74/89.17 |
| 7,610,970 B2 | | 11/2009 | Sihler et al. | |
| 7,730,972 B2 | * | 6/2010 | Hall et al. | 175/61 |
| 2005/0236189 A1 | * | 10/2005 | Rankin, III | 175/73 |
| 2011/0053730 A1 | * | 3/2011 | Fox et al. | 475/347 |

* cited by examiner

*Primary Examiner* — Shane Bomar
*Assistant Examiner* — Kipp Wallace
(74) *Attorney, Agent, or Firm* — Chadwick A. Sullivan; Brigitte Echols

(57) ABSTRACT

A technique facilitates control over the orientation of a bottom hole assembly. A planetary gearbox assembly incorporates a sun wheel which cooperates with planet wheels at a plurality of levels along the planetary gear box assembly. The sun wheel and the planet wheels cooperate to convert rotational input to rotational output through an output carrier. Torsional rigidity characteristics of the sun wheel and the output carrier are selected to distribute torque loading across the plurality of levels of the planetary gear box assembly. The distributed forces reduce the potential for component failure.

17 Claims, 3 Drawing Sheets ered. Directional control, also referred to as "directional drilling," is accomplished using special BHA configurations, instruments to measure the path of the wellbore in three-dimensional space, data links to communicate measurements taken downhole to the surface, mud motors, and special BHA components and drill bits. The directional driller can use
COILED TUBING ORIENTER TOOL WITH HIGH TORQUE PLANETARY GEAR STAGE DESIGN DRIVE

BACKGROUND OF THE DISCLOSURE

1. Field of the Disclosure

The subject disclosure relates generally to oilfield drilling, and more particularly to bottom hole assemblies and tools for orienting a bottom hole assembly (BHA).

2. Background of the Related Art

In conventional drilling, the BHA is lowered into the wellbore using jointed drill pipes or coiled tubing. Often the BHA includes a mud motor, directional drilling and measuring equipment, measurements-while-drilling tools, logging-while-drilling tools and other specialized devices. A simple BHA having a drill bit, various crossovers, and drill collars is relatively inexpensive, costing a few hundred thousand US dollars, while a complex BHA costs ten times or more than that amount.

Many drilling operations require directional control so as to position the well along a particular trajectory into a formation. Directional control, also referred to as "directional drilling," is accomplished using special BHA configurations, instruments to measure the path of the wellbore in three-dimensional space, data links to communicate measurements taken downhole to the surface, mud motors, and special BHA components and drill bits. The directional driller can use drilling parameters such as weight-on-bit and rotary speed to deflect the bit away from the axis of the existing wellbore. In some cases, e.g. when drilling into steeply dipping formations or when experiencing an unpredictable deviation in conventional drilling operations, directional-drilling techniques may be employed to ensure that the hole is drilled vertically.

Direction control is most commonly accomplished through the use of a bend near the bit in a downhole steerable mud motor. The bend points the bit in a direction different from the axis of the wellbore when the entire drill string is not rotating. By pumping mud through the mud motor, the bit rotates though the drill string itself does not, allowing the bit alone to drill in the direction to which it points. When a particular wellbore direction is achieved, the new direction may be maintained by then rotating the entire drill string, including the bent section, so that the drill bit does not drill in a direction away from the intended wellbore axis, but instead sweeps around, bringing its direction in line with the existing wellbore. As it is well known by those skilled in the art, a drill bit has a tendency to stray from its intended drilling direction, a phenomenon known as "drill bit walk". A device for addressing drill bit walk is shown in U.S. Pat. No. 7,610,970 to Sihler et al. issued Nov. 3, 2009, which is incorporated herein by reference.

The use of coiled tubing with downhole mud motors to turn the drill bit to deepen a wellbore is another form of drilling, one which proceeds quickly compared to using a jointed pipe drilling rig. By using coiled tubing, the connection time required with rotary drilling is eliminated. Coiled tube drilling is economical in several applications, such as drilling narrow wells, working in areas where a small rig footprint is essential, or when reentering wells for work-over operations.

In coiled tubing drilling, a BHA with a mud motor is attached to the end of a coiled tubing string. Typically, the mud motor has a fixed or adjustable bend housing in order to drill deviated holes. Because the coiled tubing is unable to rotate from surface, a so called orienter tool is used as part of the BHA to "orient" the bend of the mud motor into the desired direction. There exists a multitude of different designs for the drive systems of such tools. Some designs support continuous rotation such as electric motor and gearbox drives, while others only permit rotation by a certain limited angle. The orienter tool is typically a high-torque, low-speed device, wherein the design of the drive system provides a torque output which can at least match the reactive torque exerted by the drilling mud motor.

For example, some orienter tools have utilized planetary gears in an effort to drive the output shaft. Basically, creating a torque on an output shaft means that a tangential force has to be exerted. By way of example, an output torque of 1,000 ft-lbs from a 2-inch diameter shaft means a tangential force of 12,000 lbs. This amount of force will quickly yield any material unless the tangential force is evenly distributed over a sufficient area to reduce the stress levels. In a conventional planetary stage with a size constraint on the order of 3 inches in diameter, the limits of how much bending force the gear teeth can take, and how much stress the planet carrier is capable of supporting will be much below 1000 ft-lbs of torque.

SUMMARY OF THE INVENTION

A system and methodology are designed to facilitate control over the orientation of a bottom hole assembly. A planetary gear box assembly incorporates a sun wheel which cooperates with planet wheels at a plurality of levels along the planetary gear box assembly. The sun wheel and the planet wheels cooperate to convert rotational input to rotational output through an output carrier. Torsional rigidity characteristics of the sun wheel and the output carrier are selected to distribute torque load across the plurality of levels of the planetary gear box assembly. The distributed forces reduce the potential for component failure.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

Figure 1:
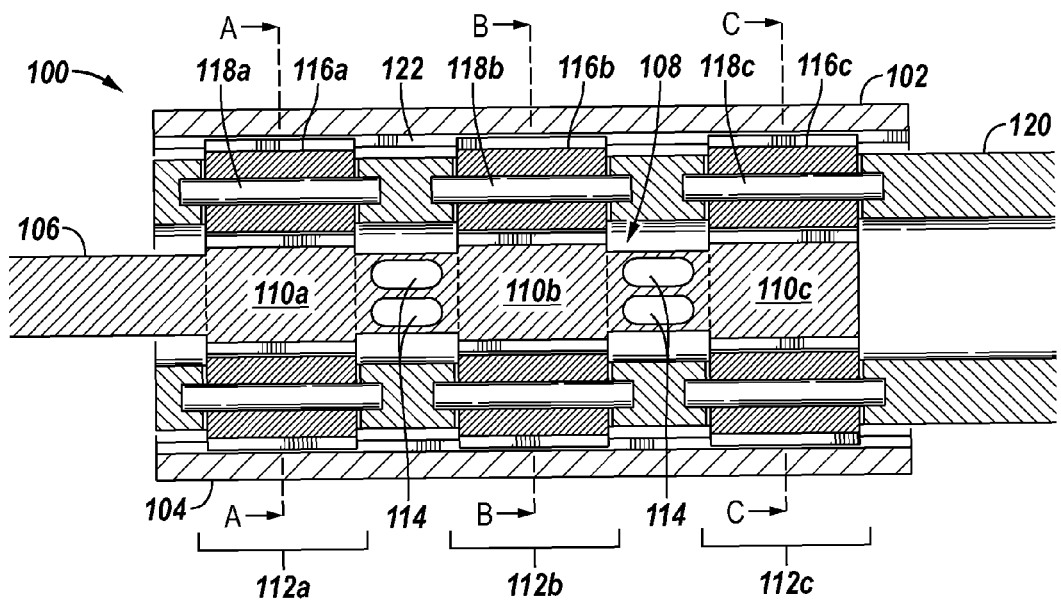
FIG. 1 is a cross-sectional view of a multi-level planetary gear box assembly for an orienter tool of a bottom hole assembly in accordance with the subject technology.

The present disclosure overcomes many of the prior art problems associated with providing torque in bottom hole assemblies. The advantages, and other features of the planetary gear box assembly disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

All relative descriptions herein such as left, right, up, and down are with reference to the Figures, and not meant in a limiting sense. Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

The subject technology generally is directed to a high torque planetary gear system for a bottom hole assembly. The planetary gear system includes a geometry where the torque load, resulting in a tangential force, is better distributed inside the structure and hence the stress levels are reduced throughout the planetary stage compared to conventional systems. In one embodiment, the planetary gear system stacks several planes of planetary gears in several levels. By matching the torsional rigidity of a sun gear with that of a carrier body, taking into account the transmission ratio, even engagement of all planetary wheels can be ensured by a principle of elastic averaging, which allows the design of a very high output torque planetary gear stage. It is envisioned that a gear box design for a downhole orienter tool in accordance with the subject technology has extremely high output torque. According to one embodiment, the gear output torque at least matches the stall torque of the mud motor which is driven/oriented by the orienter.

The present technology also is directed to a high torque planetary gear box assembly for a bottom hole assembly (BHA) used in drilling. The gear box assembly comprises a housing having at least one stage with a plurality of levels, a sun wheel for connecting to an input shaft and having a gear portion within each level, at least one planet wheel coupled to the respective gear portion in each level, and a common carrier connected to the at least one planet wheel in each level. During operation, an external torque is transmitted by the sun wheel through the plurality of levels whereby tangential forces are transmitted from the gear portions to the respective at least one planet wheel, and, in turn, from the at least one planet wheel to the common carrier. The sun wheel is designed to match torsional rigidity characteristics of the common carrier to balance the tangential forces on each level.

By way of example, the plurality of levels may be three levels and the at least one planet wheel may be two planet wheels in each level, although other numbers of levels and planet wheels may be employed. Torsionally flexible elements may be incorporated into the sun wheel, and the gear box assembly may include a housing gear for engaging the gear portions. According to one embodiment, the common carrier twists by an angle $\alpha$ as a result of torque applied thereto and the gear box assembly has a transmission ratio i such that a twisting angle $\beta$ of the sun wheel is characterized by $\beta=i*\alpha$, and a torsional rigidity of the sun wheel is about $i^2$ times less than a torsional rigidity of the common carrier to accomplish even engagement in all levels of the gear box assembly.

The subject technology also may include a method for using a high torque planetary gear box in a bottom hole assembly (BHA). The method comprises providing a housing having at least one stage with a plurality of levels; and applying torque to a sun wheel, the sun wheel having a gear portion within each level that, in turn, applies torque to at least one planet wheel coupled to the respective gear portion in each level. The method also may comprise coupling a common carrier to the at least one planet wheel in each level whereby torque is transmitted from the planet wheels thereto; and matching torsional rigidity characteristics of the sun wheel to the common carrier such that tangential forces on each level are balanced.

It should be appreciated that the present technology can be implemented and utilized in numerous ways, including without limitation as a process, an apparatus, a system, a device, a method for applications now known and later developed. These and other unique features of the system disclosed herein will become more readily apparent from the following description and the accompanying drawings.

In brief overview, the subject technology includes a gear box design for a downhole orienter tool having an extremely high output torque. In some embodiments, the gear output torque at least matches the stall torque of the mud motor which is driven/oriented by the orienter. For example, the output torque for a 3-inch size orienter tool can be on the order of 1,000 ft-lbs and above. Conventional planetary gear boxes are normally not capable of such a high torque in the desirable small sizes. Limiting factors include the strength of the gear teeth as well as the planet carrier. For multi-stage designs, the last planetary stage at the high-torque side typically endures the highest loads and will normally break first.

To evenly distribute the stress over a sufficient area, one embodiment of the subject technology uses a principle of elastic averaging to spread the torque imposed onto the output shaft over several levels of planet wheels. Preferably, fewer planets per level are used rather than the maximum number that could normally be fitted before the planets start overlapping. By using relatively fewer wheels per level, the number of windows cut into the carrier is reduced, and the carrier will be much stronger against twisting deformation.

Referring generally to FIG. 1, a multi-level stage 102 of a planetary gear box assembly 100 in accordance with the present technology is shown. The planetary gear box assembly 100 may include a plurality of stages or simply be a single stage as shown within a housing 104. The multi-level stage 102 has an input shaft 106. The input shaft 106 may be part of a motor or even the output of a previous stage. A sun wheel 108 is connected to or an extension of the input shaft 106 and has a gear portion 110a-c within each level 112a-c, respectively. One or more torsionally flexible elements 114 may be incorporated in the sun wheel 108 intermediate each sun gear portion 110a-c.

In the example illustrated, the multi-level stage 102 includes two planet wheels 116a-c in each of the three levels 112a-c, respectively. There could be more or less planet wheels per level, perhaps even up to as many planet wheels as can be fitted in each gear box level without overlapping, depending on the design. Further, there could be more or less levels. Each planet wheel 116a-c connects to and is supported by a respective planet axle 118a-c. The planet wheels 116a-c of all levels 112a-c are all connected to a common carrier 120. The common carrier 120 may be an output carrier, such as an output shaft or an input shaft connected to another stage (not shown). The planet wheels 116a-c also engage a housing gear 122 mounted within the housing 104. As would be known to those of ordinary skill in the art, each of the sun gear portions 110a-c, planet wheels 116a-c, housing gear 122, and common carrier 120 include force transfer members, e.g. teeth (not explicitly shown) that engage and interact to transmit forces therebetween.

During operation, an external torque being transmitted by the input shaft 106 through the multi-level stage 102 results in a series of tangential forces occurring between the surfaces of the gear teeth that are interacting with each other. Tangential forces are transmitted from the sun gear portions $110a\text{-}c$ to the planet wheels $116a\text{-}c$, and, in turn, from the planet wheels $116a\text{-}c$ to the common carrier 120. Tangential forces are also being transmitted to the housing gear 122.

Because the pairs of planet wheels $116a\text{-}c$ are divided into several levels $112a\text{-}c$ rather than all being in one level, the total torque exerted onto the common carrier 120 (e.g., output shaft) is the result of all the tangential forces acting in the different levels. The resulting tangential forces will cause the common carrier 120 to twist by a certain amount.

Figure 2:
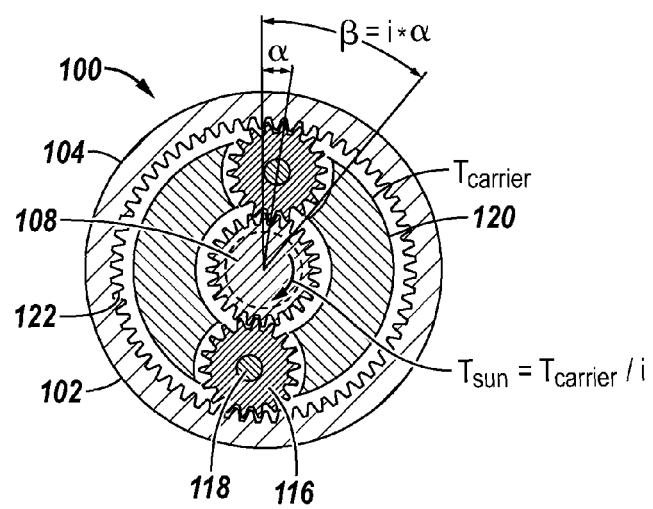
FIG. 2 is a schematic cross-sectional view of the multi-level planetary gear box assembly of FIG. 1 taken along lines A-A, B-B and C-C.

Referring generally to FIG. 2, a somewhat schematic cross-sectional view of the multi-level planetary gear box assembly 100 of FIG. 1 taken along lines A-A, B-B and C-C is shown to representatively indicate operational effects in each level $112a\text{-}c$. In each level, the common carrier 120 will twist by a certain angle $\alpha$ as a result of the torque applied. Due to the inherent gear ratio of the planetary gear box assembly 100, the angle $\alpha$ of the common carrier 120 will require a twisting angle $\beta = i*\alpha$ of the sun wheel 108 in order to satisfy geometric compatibility, where i is the transmission ratio of the planetary stage 102. On the other hand, the torque seen by the sun wheel 108 is reduced by a factor of the transmission ratio i as compared to the torque seen by the common carrier 120. The torque applied to the sun wheel 108 is represented by the arrow "$T_{sun}$" and is equal to $T_{Carrier}/i$. These calculations assume that the housing gear 122 is substantially infinitely stiff with no appreciable twisting. In practice, the housing gear 122 may twist and such twisting should be taken into account, but to simplify for illustrative purposes, this assumption may be utilized.

Referring again to FIG. 1, the twisting angle of the common carrier 120 with respect to itself in cross section along line A-A will be larger than in cross section along line C-C because if the sun wheel 108 was infinitely stiff in torsion, most of the output torque would be taken by the components of level $112c$ only. As a result, the components of level $112c$ would wear out quickly. However, in the present approach the sun wheel 108 is designed to match or otherwise address the torsional rigidity characteristics of the common carrier 120 so the principle of elastic averaging will ensure that the tangential forces on all planet levels $112a\text{-}c$ are distributed, e.g. balanced. When the load distribution is balanced, the loading is taken by all planet levels $112a\text{-}c$ approximately evenly. If the sun wheel 108 is inherently too stiff to support the desired flexibility, torsionally flexible elements 114 can be used to increase the flexibility.

Referring again to FIG. 2, it is possible to quantify the required balance of torsional rigidities to ensure elastic averaging. Preferably, the sun wheel 108 twists by an angle i times larger with a torque which is i times less than that of the common carrier 120. Hence, the torsional rigidity of the sun wheel 108 should be about $i^2$ times less than that of the common carrier 120 to ensure even engagement in all levels $112a\text{-}c$ of the gear box assembly 100.

Figure 3:
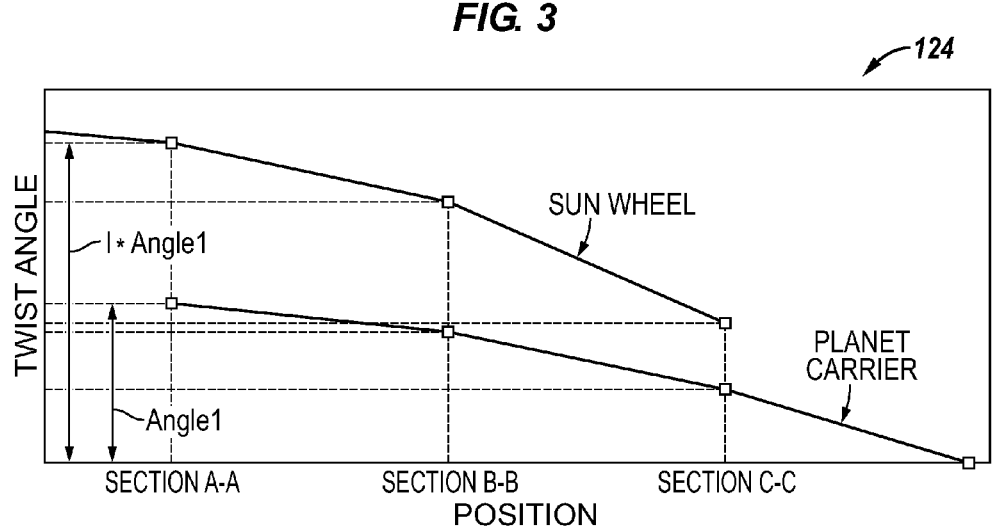
FIG. 3 is a qualitative plot of a twisting angle of the components of the planetary gear box assembly of FIG. 1.

Referring generally to FIG. 3, a qualitative plot 124 of a twisting angle of the components of the planetary gear box assembly 100 is shown. The plot 124 shows the torsional displacement situation inside the gear box assembly 100. For illustrative purposes, it is assumed that the planet carrier or common carrier 120 is fixed to ground and a torque is applied to the input shaft 106 to create the internal twisting deformations. The twist angle is then measured with respect to ground. In each section, the twisting angle of the sun wheel 108 is approximately i times that of the common carrier 120 for geometric compatibility.

It should be noted that the lines in FIG. 3 are purely qualitative. In reality, the twisting angle as a function of position of the common carrier 120 and sun wheel 108 may be more complex, and in addition, such factors as the twisting of the housing 104 can be taken into account. However, the plot 124 well illustrates that by matching the torsional rigidities of the components involved, taking into account the gear ratio, elastic averaging is accomplished which enables the design of a planetary gear stage capable of much greater torque than conventional 1-level-per-stage designs.

Figure 4:
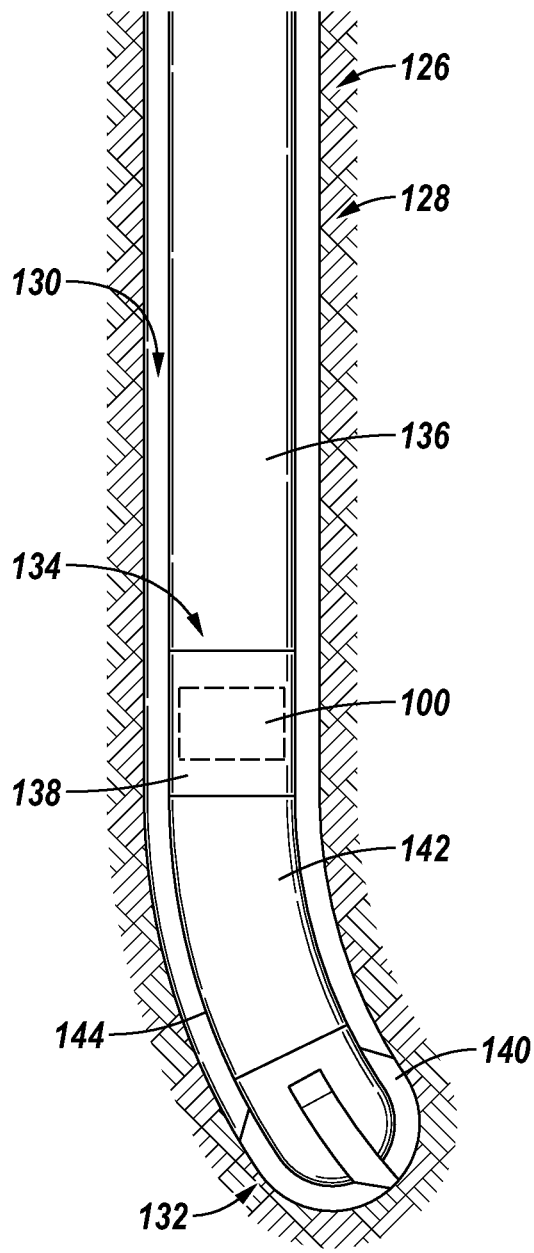
FIG. 4 is a schematic illustration of a drilling system having a bottom hole assembly utilizing the planetary gear box assembly.

Referring generally to FIG. 4, an example of a well system 126 is illustrated as deployed in a well 128 defined by at least one wellbore 130 having at least one deviated wellbore section 132 being formed. Although the planetary gear box assembly 100 may be utilized in a variety of downhole systems to provide improved control over the orienting of a variety of components, the drilling example is illustrated in FIG. 4. In this example, the well system 126 comprises a drilling system having a bottom hole assembly 134 delivered downhole by a suitable conveyance 136, such as coiled tubing.

In the embodiment illustrated, bottom hole assembly 134 comprises an orienting tool 138 containing the planetary gear box assembly 100. The orienting tool 138 and its planetary gear box assembly 100 may be used to ultimately control the drilling orientation of a drill bit 140. In some drilling operations, the drill bit 140 is powered by a motor 142, such as a mud motor. Depending on the application, the motor 142 may work in cooperation with a bent housing 144 and the orienting tool 138 to control the desired direction of drilling. As known to those of ordinary skill in the art, bottom hole assembly 134 may comprise a variety of other components, including steering components, valve components, sensor components, measurement components, drill collars, crossovers, and/or other components. The actual selection of components depends on, for example, the specifics of the drilling application and/or the characteristics of the environment.

As would be appreciated by those of ordinary skill in the pertinent art, the subject technology is applicable to use in a variety of applications with significant advantages for bottom hole assembly applications. The functions of several elements may, in alternative embodiments, be carried out by fewer elements, or a single element. Similarly, in some embodiments, any functional element may perform fewer, or different, operations than those described with respect to the illustrated embodiment. Also, functional elements shown as distinct for purposes of illustration may be incorporated within other functional elements, separated in different hardware or distributed in various ways in a particular implementation. Further, relative size and location are merely somewhat schematic and it is understood that not only the same but many other embodiments could have varying depictions.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A high torque planetary gear box assembly for a bottom hole assembly (BHA) used in drilling, the gear box assembly comprising:
   a housing having at least one stage with a plurality of levels;
   a sun wheel for connecting to an input shaft and having a gear portion within each level;

at least one planet wheel coupled to the respective gear portion in each level; and a common carrier connected to the at least one planet wheel in each level, wherein the common carrier twists by an angle α as a result of torque applied thereto and the gear box assembly has a transmission ratio i such that a twisting angle β of the sun wheel is characterized by β=i*α, and a torsional rigidity of the sun wheel is about $i^2$ times less than a torsional rigidity of the common carrier to accomplish balanced engagement in all levels of the gear box assembly;

wherein during operation, an external torque is transmitted by the sun wheel through the plurality of levels whereby tangential forces are transmitted from the gear portions to the respective at least one planet wheel, and, in turn, from the at least one planet wheel to the common carrier, and the sun wheel is designed to match torsional rigidity characteristics of the common carrier to substantially balance the tangential forces on each level.

2. The high torque planetary gear box assembly as recited in claim 1, wherein the plurality of levels is three levels and the at least one planet wheel is two planet wheels in each level.

3. The high torque planetary gear box assembly as recited in claim 1, further comprising torsionally flexible elements incorporated in the sun wheel.

4. The high torque planetary gear box assembly as recited in claim 1, further comprising a housing gear for engaging the gear portions.

5. A method for using a high torque planetary gear box in a bottom hole assembly (BHA), the method comprising:

providing a housing having at least one stage with a plurality of levels;

applying torque to a sun wheel, the sun wheel having a gear portion within each level that, in turn, applies torque to at least one planet wheel coupled to the respective gear portion in each level;

coupling a common carrier to the at least one planet wheel in each level whereby torque is transmitted from the planet wheels thereto, wherein the common carrier twists by an angle α as a result of torque applied thereto and the gear box assembly has a transmission ratio i such that a twisting angle β of the sun wheel is characterized by β=i*α, and a torsional rigidity of the sun wheel is about $i^2$ times less than a torsional rigidity of the common carrier to accomplish even engagement in all levels of the gear box; and matching torsional rigidity characteristics of the sun wheel to the common carrier such that tangential forces on each level are balanced.

6. The method as recited in claim 5, wherein the plurality of levels is three levels and the at least one planet wheel is two planet wheels in each level.

7. The method as recited in claim 5, wherein torsionally flexible elements are incorporated in the sun wheel.

8. The method as recited in claim 5, further comprising providing a housing gear for engaging the gear portions.

9. A method of controlling a drilling direction when drilling a wellbore, comprising:

providing a bottom hole assembly with an orienting tool to control a drilling direction;

employing a planetary gear box assembly in the orienting tool;

adjusting the orientation of the orienting tool by rotating an input shaft which drives an output carrier via a sun wheel engaging planet wheels at a plurality of gear box levels; and distributing torque through the plurality of gear box levels by selecting torsional rigidity characteristics of the sun wheel which correspond with torsional rigidity characteristics of the output carrier, wherein the distributing torque comprises selecting the output carrier and the sun wheel such that as the output carrier twists by an angle α as a result of torque applied thereto and the gear box assembly has a transmission ratio i such that a twisting angle β of the sun wheel is characterized by β=i*α, and a torsional rigidity of the sun wheel is about $i^2$ times less than a torsional rigidity of the common carrier to accomplish balanced engagement in all levels of the gear box assembly.

10. The method as recited in claim 9, wherein distributing torque comprises evenly balancing the loading acting at each gear box level on the planet wheels.

11. The method as recited in claim 9, wherein providing comprises providing the bottom hole assembly with a mud motor.

12. The method as recited in claim 11, further comprising providing the planetary gear box assembly with an output torque at least as great as a stall torque of the mud motor.

13. The method as recited in claim 9, wherein adjusting comprises using two planet wheels at each gear box level.

14. The method as recited in claim 13, wherein adjusting comprises providing the planetary gear box assembly with at least three gear box levels.

15. The method as recited in claim 14, wherein adjusting comprises using at least three separate gear portions of the sun wheel to drive the planet wheels.

16. The method as recited in claim 15, further comprising incorporating torsionally flexible elements between the separate gear portions of the sun wheel to establish a desired torsional rigidity of the sun wheel.

17. The method as recited in claim 9, further comprising drilling a deviated wellbore along a desired drill path by using the orienting tool to adjust the drilling direction.

* * * * *